US008959085B2

(12) United States Patent  
Fisher et al.

(10) Patent No.: US 8,959,085 B2  
(45) Date of Patent: Feb. 17, 2015

(54) PLAYLIST RESOLVER

(75) Inventors: Roberto Warren Fisher, Los Angeles, CA (US); Chris Kalaboukis, Los Gatos, CA (US); Ronald Martinez, San Francisco, CA (US); Ian C. Rogers, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1535 days.

(21) Appl. No.: 11/869,926

(22) Filed: Oct. 10, 2007

(65) Prior Publication Data

US 2009/0100062 A1  Apr. 16, 2009

(51) Int. Cl.
*G06F 7/00* (2006.01)
*G06F 17/30* (2006.01)

(52) U.S. Cl.
CPC .... *G06F 17/30778* (2013.01); *G06F 17/30749* (2013.01)
USPC .......................................................... 707/726

(58) Field of Classification Search
None
See application file for complete search history.

(56) References Cited

U.S. PATENT DOCUMENTS

| 6,441,291 | B2 | 8/2002 | Hasegawa |
| 6,578,047 | B1 | 6/2003 | Deguchi |
| 6,822,153 | B2 | 11/2004 | Comair |
| 7,165,071 | B2 | 1/2007 | Fanning et al. |
| 7,200,586 | B1 | 4/2007 | Deguchi et al. |
| 7,279,629 | B2 | 10/2007 | Hinman |
| 8,145,727 | B2 | 3/2012 | Fisher et al. |

| 2001/0025256 | A1 | 9/2001 | Oliphant et al. | |
| 2003/0046703 | A1 | 3/2003 | Knowles et al. | |
| 2004/0078293 | A1 | 4/2004 | Iverson et al. | |
| 2004/0128141 | A1 | 7/2004 | Murase | |
| 2005/0120868 | A1* | 6/2005 | Hinman et al. | ................. 84/615 |
| 2005/0193094 | A1 | 9/2005 | Robbin et al. | |
| 2005/0216417 | A1* | 9/2005 | Risan et al. | ..................... 705/52 |
| 2006/0015573 | A1* | 1/2006 | Hurst-Hiller et al. | ......... 709/218 |
| 2006/0180007 | A1 | 8/2006 | McClinsey | |
| 2007/0033229 | A1 | 2/2007 | Fassett et al. | |

(Continued)

FOREIGN PATENT DOCUMENTS

JP  2001-318949  11/2001
KR  10-2006-0135692  11/2006

OTHER PUBLICATIONS

PCT, Korean IPO, Notification of Transmittal of the International Search Report and the Written Opinion of the International Searching Authority, or the Declaration, Mar. 24, 2009.

(Continued)

*Primary Examiner* — Usmaan Saeed
*Assistant Examiner* — Michele Choi
(74) *Attorney, Agent, or Firm* — James J. DeCarlo; Greenberg Traurig, LLP

(57) ABSTRACT

A real-time locater for digital media objects, related to one or more musical compositions and accessible over a network, is described. A service-provider maintains a master index of the digital media objects and a playlist-resolver server. The master index is organized by considering each media object to be an example of a primary attribute associated with the media object by a multitude of users. The reference is constructed as a data structure of primary attributes and means of locating the media objects as instances of primary attributes. The playlist-resolver works with the master index to translate a list of references to creative works into a series of successful accesses to the corresponding media object files.

14 Claims, 8 Drawing Sheets

(56) References Cited

U.S. PATENT DOCUMENTS

| | | |
|---|---|---|
| 2007/0055689 A1 | 3/2007 | Rhoads et al. |
| 2007/0220430 A1 | 9/2007 | Sato |
| 2007/0288478 A1 | 12/2007 | DiMaria et al. |
| 2009/0100062 A1 | 4/2009 | Fisher et al. |
| 2009/0100151 A1 | 4/2009 | Fisher et al. |

OTHER PUBLICATIONS

PCT Notification of Transmittal of the Intl. Search Report and the Written Opinion of the Intl. Searching Authority, or the Declaration, mailed May 28, 2009, with regard to PCT/US2008/079154 filed Oct. 8, 2008.

Fisher et al., U.S. Appl. No. 11/869,887 Communication received from the U.S. Patent and Trademark Office dated Sep. 30, 2009.

Translation of Abstract, Japanese Publication No. JP2001318949 published Nov. 16, 2001.

Translation of Korean Application No. KR 10-2006-0135692 published Dec. 29, 2006.

USPTO Communication for Fisher et al., U.S. Appl. No. 11/869,887 dated May 12, 2010, 31 pages.

* cited by examiner

PLAYLIST RESOLVER

TECHNICAL FIELD

The present disclosure relates generally to distribution of multimedia content over interactive networks, and particularly, to an optimized mechanism for locating audio media objects accessible over the network.

BACKGROUND

As means of communication improve, users of communication devices connected in a network have an increased ability to consume multimedia content over the network. This disclosure relates generally to improved means of network access to media objects related to musical works.

Modern communication networks are typically hierarchical transmission networks with multiple layers of transmission protocols. A transmission network is a system that allows two or more transceivers to exchange data, whereas a transmission protocol is a sequence of standard interactive steps that facilitate the exchange. Typically, the lowest level protocols are more concretely tied to the interaction of physical circuitry, whereas higher levels of protocols are more abstract to facilitate higher level processing at an algorithmic level. For example, in the vernacular "the web," also known as "the Internet," has become shorthand for a multi-layer computer communications system, which combines higher level protocols for access, mid-level protocols, such as a means of locating resources available on the network through a system of uniform resource locaters (URLs), and low-level hardware protocols which control the exchange of large, uneven blocks of data by breaking them into smaller, standardized packets. Users seek improved means to locate and consume musical works on the Internet, and to share those works with other users, without the burden of managing lower-level protocols or learning new programming languages.

Users communicating over a network typically use a physical device, such as a telephone, a text messenger, a cell phone, a personal digital assistant (PDA), a music/video player, a personal computer, or a public terminal, to interconnect with service providers and other users on the network. A typical network user utilizes a number of application programs to create or consume content on the network. Example application programs include a "media object player," a "music player", and a "browser".

A browser is an application program that is generally intended to display "web pages." A web page is typically a two-dimensional image appearing as an individual page of information including one or more types of contained media. This multimedia content appears in a virtual book format, which typically is displayed as an individually framed "web page" along with means for navigating to other related web pages. The multimedia content may be directly perceived on the web page or may be indirectly accessible. Directly perceived content on the page may include displayed images, videos, or a media object player rendered within the image of the page. Examples of indirect access include access through a pop-up window, through an auxiliary media object player program, or access provided through a link to the location of another page. Many web pages incorporate one or more "hot links." The hot link enables a content consumer to access another web page or another application by using a pointing device to locate and click on the link.

A media object player is typically a software program on a computer including a user interface for perceiving a media object. Examples of stand-alone media object players include Microsoft's Windows Media Player®, Apple inc.'s QuickTime®, and Real Networks Inc.'s RealPlayer®. A typical media object player is able to render various forms of media content, including audio recordings, video recordings, and compressed recordings.

A networked media object player may also be implemented as a combination of software routines for network access and a dedicated hardware device, with one or more rendering components included in the hardware device. Examples include Sansa's Connect® player, the Sony Network Walkman®, and Microsoft's Zune® player. Network users who are media object consumers frequently purchase audio and video media objects online for their portable players.

In the last 20 years, the music distribution industry has evolved. Formerly, a consumer typically purchased an analog copy of a musical video, album, or single from a traditional brick-and-mortar store. Music sales were dominated by sales of vinyl and compact disc (CD) albums. Today, the music industry is dominated by Internet access to a variety of digital media objects related to musical works, which are typically accessed from online computer server systems. The digital media objects include digitized audio recordings, and may include additional media objects such as video recordings, song lyrics, cover and other album art, interviews with the artist, fan pictures, and so on. A consumer may purchase their own copy of a digital media object through an Internet service provider, such as Apple iTunes®, or may purchase access rights to a subscription service, such as Yahoo! Music Engine®. Alternatively, a consumer may access media objects which are freely available on the Internet, such as a promotional song on an artist's website, or access media objects supported by an alternative business model, such as by provider-included advertising.

Further, modern consumer preferences tend toward the purchase of individual songs and relative sales of musical albums have plummeted. In the typical transaction, the modern consumer is more likely to consider the unit of consumption as an individual song, equating the primary concept of a musical work as the concept of an individual song. The consumer seeks improved access to a plurality of songs, and to share his or her accessed songs with fellow consumers.

A first user attempting to share one or more songs with a second network user may encounter difficulties. Typically, a consumer license for a digital media object related to a musical work does not allow direct transfers of that media object to other consumers. Instead, the second user typically must be provided with a reference to the media object, such as by referring to a song as the name of a musical composition performed by a particular artist. Further, a first user may share a "playlist" consisting of a sequence of songs to be played in the listed order. A second network user seeking access to one or more playlist songs must determine a location on the network from a song reference.

A first user attempting to share one or more songs with a second network user may attempt to provide a network location directly, such as by providing a linking URL with the network location of a service provider or a copy of the media object. However, there may be differing restrictions on the use of a copy of the media object for the two users. For example, a first user in the United States might enjoy the song entitled "The Glamorous Life" as written by "Prince" and performed by the artist "Sheila E." A second user in the United Kingdom may seek access to a copy of the same song. Unfortunately, a song distributor is typically licensed to distribute the song within a limited geographic region, and the song distributor may be subject to penalties for providing the copy outside of that region. Further, access to a particular copy of a media object may depend on one or more access privileges of the requester, such as the status of a requester subscription to a service provider. A first user cannot guarantee that a second user can access a song at the same location that the first user is able to access.

Further, the second user might not be able to access the same servers as the first user, might not have the same subscription privileges as the first user, may have to seek a United Kingdom as opposed to a United States distributor, may be using a different media object player requiring a different format, and so on. The consumers seek improved means to locate and consume media objects related to songs on the Internet, and to share those media objects with other users, without the burden of managing various access protocols.

Typically, a user sharing a playlist consisting of one or more songs relies on a service provider to host the playlist and manage references to listed songs. A typical service provider hosting a playlist is limited to managing references to the service provider's songs. Playlist composing users seek improved means to share playlists incorporating references to songs from a plurality of service providers, and playlist consuming users seek improved means to locate songs from a variety of providers, which conform to geographic and other access restrictions.

SUMMARY

A real-time locater for a list of one or more digital media objects, related to one or more songs and accessible over a network, is described. A service-provider maintains a master index server and a playlist-resolving server for the digital media objects. The master index is organized by considering each media object to be an example of a primary attribute associated with the media object by a multitude of users. Each digital media object is considered an instance of one of these primary attributes, and the master index is constructed as a data structure of primary attributes and means of locating the media objects as instances of primary attributes. When a user seeks to perceive the list of media objects, the playlist-resolver works in conjunction with the master index to automatically locate an accessible copy of each song in the list for the user.

DETAILED DESCRIPTION

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

The following description sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the means used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers which can be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable computer-readable storage medium. A computer-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

Figure 1:
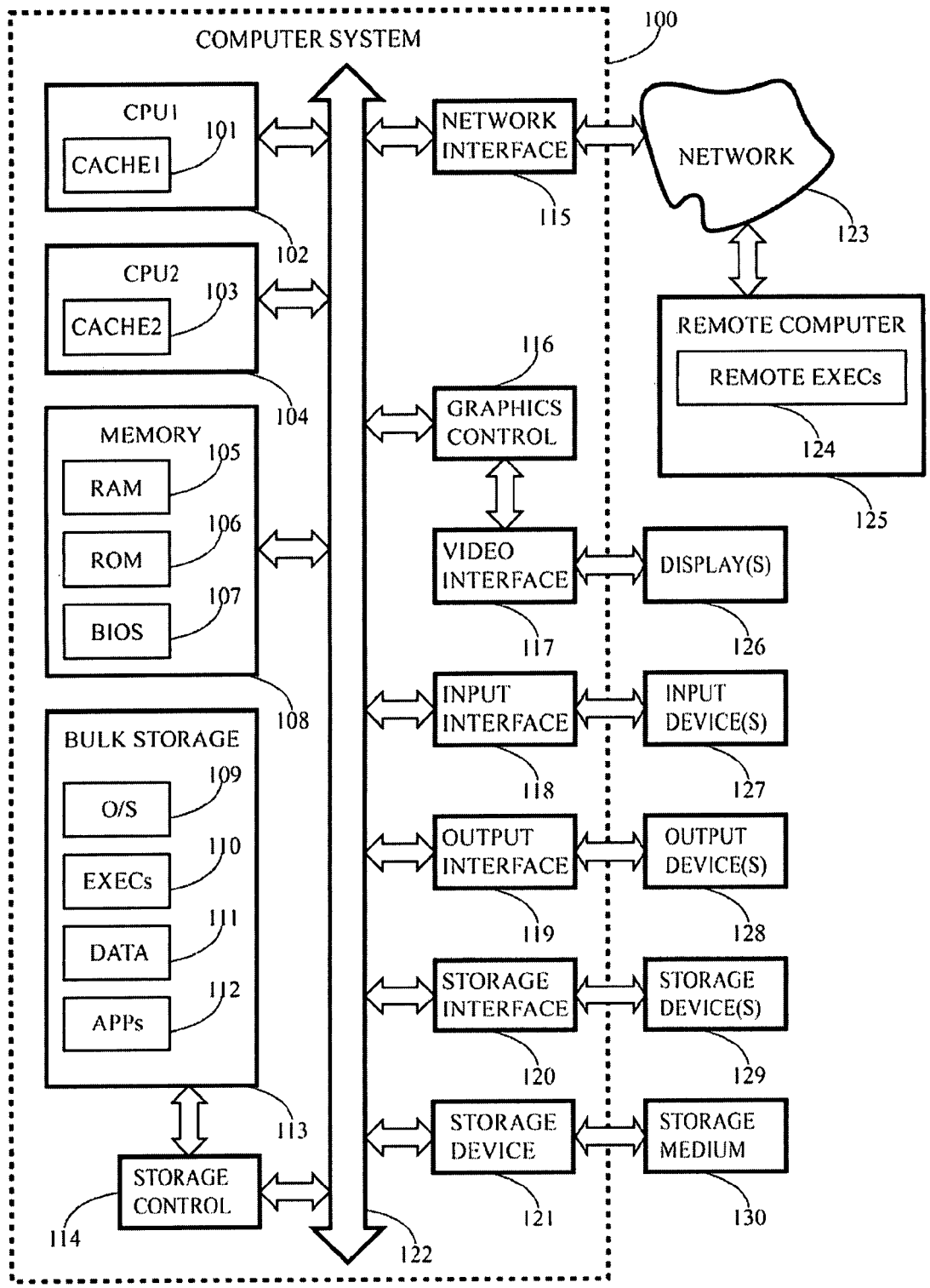
FIG. 1 is a block diagram of computer system architecture.

Server systems described herein can be implemented by a variety of computer systems and architectures. FIG. 1 illustrates suitable components in an exemplary embodiment of a general purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Computer system 100 accesses one or more applications and peripheral drivers directed to a number of functions described herein. Components of the computer system 100 may include, but are not limited to, a processor module 102, a system memory 108, and a system bus 122 that couples various system components including the system memory 108 to the processor module 102. Processor module 102 comprises a central processing unit CPU1 and a cache memory CACHE1 at 101. As used by those skilled in the art, a signal "bus" refers to a plurality of digital signal lines serving a common function. The system bus 122 may be any of several types of bus structures including a memory bus, a peripheral bus, and a local bus using any of a variety of bus architectures. By way of example, and not limitation, such architectures include Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

An operating system manages the operation of computer system 100, including the input and output of data to and from applications (not shown). The operating system provides an interface between the applications being executed on the system and the components of the system. According to one embodiment of the present invention, the operating system is a Windows® 95/98/NT/XP/Vista/Mobile operating system, available from Microsoft Corporation of Redmond, Wash. However, the present invention may be used with other suitable operating systems, such as an OS-X® operating system, available from Apple Computer Inc. of Cupertino, Calif., a UNIX® operating system, or a LINUX operating system.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can accessed by the computer system 100.

Communication media may also embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 108 includes computer storage media in the form of volatile and/or nonvolatile memory such as read only memory (ROM) 106 and random access memory (RAM) 105. A basic input/output system 107 (BIOS), containing the basic routines that help to transfer information between elements within computer system 100, such as during start-up, is typically stored in ROM 106 and other non-volatile storage, such as flash memory. Additionally, system memory 108 may contain some or all of the operating system 109, the application programs 112, other executable code 110 and program data 111. Memory 108 typically contains data and/or program modules that are immediately accessible to and/or presently being operated on by CPU1 of processor module 102. Optionally, a CPU may contain a cache memory unit 101 for temporary local storage of instructions, data, or computer addresses.

The computer system 100 may also include other removable/non-removable, volatile/nonvolatile computer storage media. By way of example only, FIG. 1 illustrates a bulk storage 113 that reads from or writes to one or more magnetic disk drives of non-removable, nonvolatile magnetic media, and storage device 121 that may be an optical disk drive or a magnetic disk drive that reads from or writes to a removable, nonvolatile storage medium 130 such as an optical disk or a magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. Bulk storage 113 and the storage device 121 may be connected directly to the system bus 122, or alternatively may be connected through an interface such as storage controller 114 shown for bulk storage 113. Storage devices may interface to computer system 100 through a general computer bus such as 122, or may interconnect with a storage controller over a storage-optimized bus, such as the Small Computer System Interface (SCSI) bus, the ANSI ATA/ATAPI bus, the Ultra ATA bus, the FireWire (IEEE 1394) bus, or the Serial ATA (SATA) bus.

The storage devices and their associated computer storage media, discussed above and illustrated in FIG. 1, provide storage of computer-readable instructions, executable code, data structures, program modules and other data for the computer system 100. In FIG. 1, for example, bulk storage 113 is illustrated as storing operating system 109, application programs 112, other executable code 110 and program data 111. As mentioned previously, data and computer instructions in 113 may be transferred to system memory 108 to facilitate immediate access from CPU1 of processor module 102. Alternatively, CPU1 of processor module 102 may access stored instructions and data by interacting directly with bulk storage 113. Furthermore, bulk storage may be alternatively provided by a network-attached storage device (not shown), which is accessed through a network interface 115.

A user may enter commands and information into the computer system 100 through the network interface 115 or through an input device 127 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU1 of processor module 102 through an input interface 118 that is coupled to the system bus, but may be connected by other interface and bus structures, such as a parallel port, a game port or a universal serial bus (USB). A display 126 or other type of video device may also be connected to the system bus 122 via an interface, such as a graphics controller 116 and a video interface 117. In addition, an output device 128, such as headphones, speakers, or a printer, may be connected to the system bus 122 through an output interface 119 or the like. Further, a storage device 129, such as a memory card or external hard drive, may be connected to the system bus 122 through a storage interface 120.

The computer system 100 may operate in a networked environment using a network 123 to one or more remote computers, such as a remote computer 125. The remote computer 125 may be a terminal, a personal computer, a server, a router, a network PC, a peer device or other common network node, and typically includes many or all of the elements described above relative to the computer system 100. The network 123 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 124 as residing on remote computer 125. It will be appreciated that the network connections shown are exemplary and other means of establishing a communications link between the computers may be used.

Collectively, these elements are intended to represent a broad category of computer systems, including but not limited to general purpose computer systems based on a member of the "x86" family of CPUs manufactured by Intel Corporation of Santa Clara, Calif., the x86-compatible CPUs manufactured by Advanced Micro Devices (AMD), Inc., of Sunnyvale, Calif., and the ARM CPU, originally designed by Advanced RISC Machines, Ltd., as well as any other suitable processor. Of course, other implementations are possible. For example, the server functionalities described herein may be implemented by a plurality of server sub-systems communicating over a backplane.

Various components of computer system 100 may be rearranged, deleted, or augmented. For example, system bus 122 may be implemented as a plurality of busses interconnecting various subsystems of the computer system. Furthermore, computer system 100 may contain additional signal busses or interconnections between existing components, such as by adding a direct memory access unit (not shown) to allow one or more components to more efficiently access system memory 108.

As shown, CACHE1 and CPU1 are packed together as "processor module" 102 with processor CPU1 referred to as the "processor core." Alternatively, cache memories 101, 103, contained in 102, 104 may be separate components on the system bus. Furthermore, certain embodiments of the present invention may not require nor include all of the above components. For example, some embodiments may include a smaller number of CPUs, a smaller number of network ports, a smaller number of storage devices, or a smaller number of input-output interfaces. Furthermore, computer system 100 may include additional components, such as one or more additional processor modules, such as processor module 104 having central processing unit CPU2 and cache memory CACHE2 at 103, storage devices, memories, or interfaces. In addition, one or more components of computer system 100 may be combined into a specialized system-on-a-chip (SOC) to further system integration. In some computer system environments where component count is critical, the entire computer system may be integrated in one or more very large scale integrated (VLSI) circuit(s).

As discussed below, in one implementation, operations of one or more of the physical servers described herein is implemented as a series of software routines executed by computer system 100. Each of the software routines comprises a plurality or series of machine instructions to be executed by one or more components in the computer system, such as CPU1 or CPU2 of processor modules 102 and 104 respectively. Initially, the series of instructions may be stored on a storage device, such as bulk storage 113. However, the series of instructions may be stored in an EEPROM, a flash device, or a DVD. Furthermore, the series of instructions need not be stored locally, and could be received from a remote computer 125 or a server on a network, via network interface 115.

Figure 2:
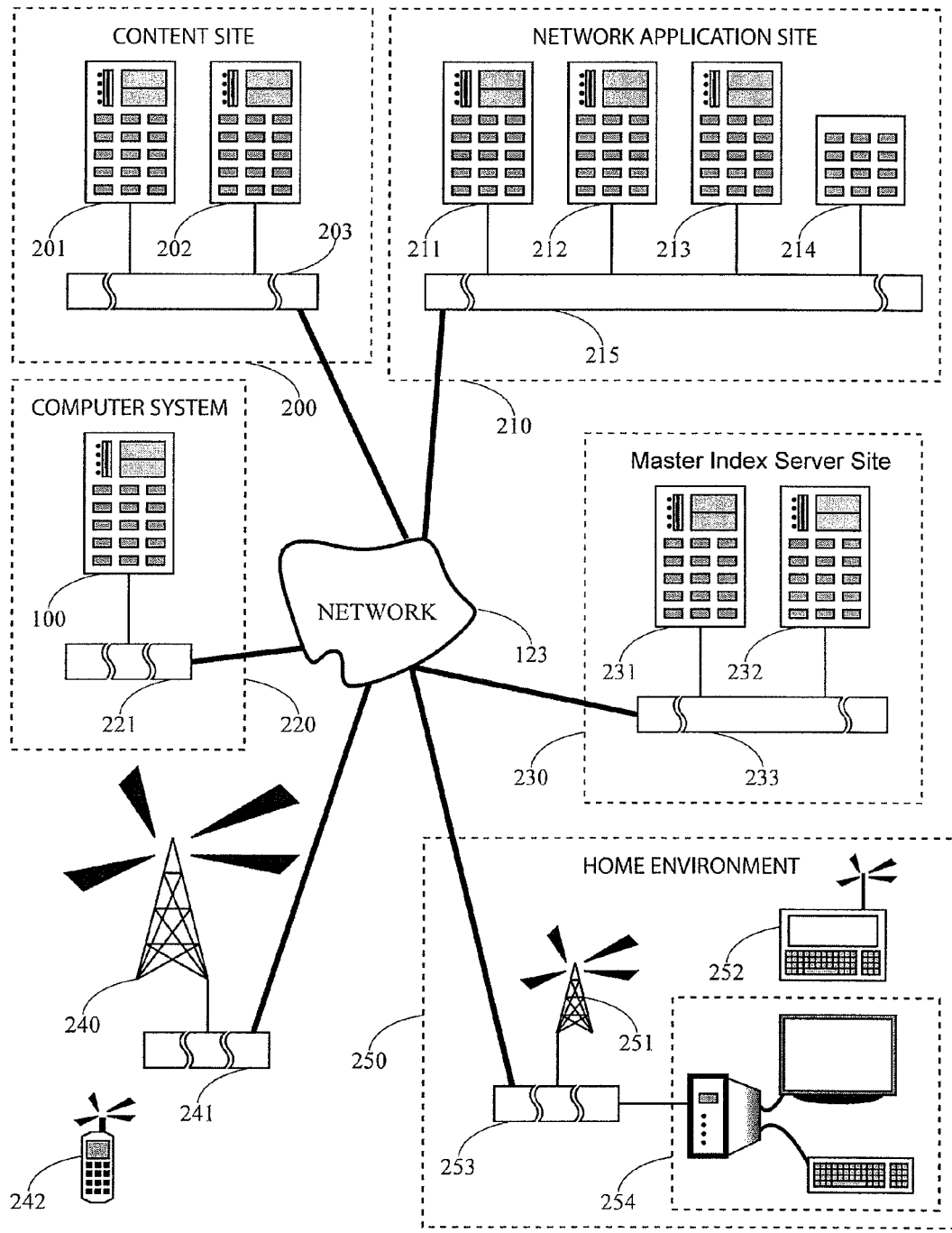
FIG. 2 illustrates an example network environment.

FIG. 2 illustrates contained computer systems, implemented using an architecture such as that of computer system 100, placed in an example wide area network environment, such as the Internet. Network cloud 123 generally represents one or more interconnected networks, connecting computer system 100, a plurality of network sites, 200, 210, 220, 230, 240, and 250, and a plurality of client devices, 242, 251, 252, and 254. Network cloud 123 may include TCP/IP based wide area networks, private networks, wireless networks, satellite networks, cellular networks, paging networks, and the like. Client systems, such as portable device 242, portable computer 252, and personal computer 254 are connected to the wide area network environment through an interne service provider (not shown), a cellular provider 240 connected to a local area network and router 241, a wireless provider (not shown), a local wireless network 251, a local wired network 253, and/or are connected indirectly to the wide area network through a computer system.

A computer system, implemented using an architecture such as that of computer system 100, is contained within the network site 220, where one or more computer systems are connected to a local area network and router 221. The one or more computer systems in site 220 are programmed to operate as a playlist-resolving server. The router 221 manages local computer communication traffic in network site 220 and interconnects with network cloud 123. Router 221 also functions to translate one or more local area network addresses in network site 220 to provide one or more unique corresponding wide area network addresses in order to facilitate communication between computer systems in network site 220 and other computer systems on the wide area network.

FIG. 2 illustrates a number of network service provider sites, including content site A 200, master index server site 230, and network application site 210. The described invention may operate with one or more content providing or application sites. Although FIG. 2 illustrates the provider sites as separate local network sites, the functionality of each site may be combined with other sites. Further, a function for a particular site may be performed in a distributed computing environment by one or more computer systems at remote sites. Further still, the functionality represented by each depicted site may be further separated into a plurality of sub-function sites. In addition, implementations of the invention may operate in network environments that include multiples of one or more of the individual sites or subsystems of sites described herein. Implementations of the invention may also operate in network environments where one of more of the systems or sites described herein has been eliminated.

Content aggregation sites are represented by content site A 200 in FIG. 2. Content is stored as one or more digital data objects, which may include media objects or executable code objects. Content site A 200 is a network addressable system that allows users to access media objects supplied by one or more users. In one implementation, content site A 200 may be a music aggregation or sharing system. Content site A 200 comprises one or more physical server systems 201, 202, implemented using an architecture such as that of computer system 100, and containing or connected to one or more bulk storage systems, such as that of bulk storage system 113, or a network attached storage device (not shown), and a local area network and router 203. One or more servers in site 200 contain media objects consisting of digital data representations of musical compositions. The one or more physical servers allow users to access one or more musical compositions by accessing corresponding digital data files. In one implementation, the functionality hosted by the one or more physical servers may include web or HTTP servers, FTP servers, and the like.

Master index server site 230 is a network addressable system that allows users to access a master index of media objects accessible on the web. Master index server site 230 comprises one or more physical server systems 231, 232 containing or connected to one or more bulk storage systems (not shown), and a local area network and router 233. The one or more physical servers 231, 232 allow the service provider (not shown) to determine and aggregate the locations of media objects available on the web. A user or another service provider on the web accesses master index server site 230 to indirectly access digital data objects available from other sites.

Network application site 210 is a network addressable system that allows users to access one or more executable code objects supplied by one or more service providers (not shown). Network application site 210 comprises one or more physical server systems 211, 212, 213 containing or connected to one or more bulk storage systems, shown as network-attached storage device 214, and a local area network and router 215. Executable code objects may include code to be executed on a user device as well as code executed within a server system, such as server 212. An example of an executable code object is an informational web site where users request and receive identified web pages and other content over the network cloud 123. The executable code object may also be a posting forum, where users may submit or otherwise configure media objects to be perceived by other users. The executable code object may also be a social network application, such as a chat client or e-mail client. The executable code object may also be a web-posting application, allowing users to configure and maintain personal web pages. One or more executable code objects may also combine to form a content distribution application that displays available media objects and transmits them to users. Examples of network application sites include Yahoo! Music Engine®, Apple iTunes®, and podcasting servers.

In media object aggregation or sharing systems, such as the Yahoo! Flickr® photo sharing site, media objects are typically contained in data objects which also contain metadata related to the media object. For example, a data object containing a media object may also contain one or more secondary attributes to identify related media objects. For example, a music sharer may upload a performance of a song to a music sharing site, and consider the song related to a set of keywords, such as "Lyle-Lovett," "blue-grass," "love-songs," and "slide-guitar." The song sharer may further categorize and configure the media object by combining the media object with the set of secondary attributes in a data object. By configuring the data object in this manner, other users may locate the media object by searching for objects with the related secondary attributes.

Particular types of media objects, such as songs, tend to share common characteristics. For example, a consumer typically relates a song by the artist "Sheila E." to other songs by the artist "Sheila E." As explained in U.S. Publication No. 2009/0100151, which corresponds to U.S. patent application Ser. No. 11/869,887, filed on Oct. 10, 2007, master index server site 230 may input or dynamically generate a set of secondary attributes that relate two or more media objects, such as songs.

In the context of a computer network, a "virtual server" is physically one or more server systems connected to the network and support circuitry to execute application programs which process data. Data may be stored by means which facilitate efficient processing, such as by storing the data in a "database" consisting of a collection of data organized by relationships between the various forms of data contained therein. When a virtual server consists of more than one computer server system, the set of computer server systems is interconnected hierarchically to perform high-level functions as combined functions of several servers under central control.

Functionally, a virtual server executes a sequence of low-level CPU commands to complete instructions for processing data. A virtual server typically accepts instructions and executes commands for a multitude of "clients". The instructions may include, but are not limited to, instructions to store or retrieve data, to modify, verify or erase data, or to reorganize data. A virtual server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient servers, such as a "jazz server," a "hip-hop server," a "classical server," and so on, to register paying user requests in a "billing server," to verify the identity, preferences, and access privileges of a user in a "registration server" and so on. The music server may therefore also be a client of other servers. Practitioners of the art will recognize that virtual servers and clients are abstract interactive devices controlled by software instructions, whose interaction protocols may be flexibly defined. A "client" as used herein may include functionally to process information and programs, as well as to issue commands. Similarly, a virtual server as used herein may include functionally to initiate commands to users and other servers as well as to respond to instructions.

Similarly, a database should not be construed to be a single physical collection of data. As used herein, a database is an abstract collection of data which may be distributed over one or more physical locations. Said data may be stored physically within a single or multiple servers, within attached physical device(s), network attached device(s), or user devices(s). Similarly, an application program should not be construed to be a single physical collection of commands. As used herein, an application program is an abstract collection of CPU commands, which may be physically executed, in whole or in part, within a single or multiple servers, within attached physical devices(s), within network attached device(s), or within user device(s).

A means of organizing an index to media objects available on a network is described. It is assumed that the media objects constitute a set of fundamentally related objects, in the sense that network users associated each of the media objects with a primary attribute (or concept) and one or more secondary attributes. As an example, a means of organizing media objects related to songs is discussed. In this environment, it is assumed that network users primarily associate each of the media objects with an underlying song.

In the master index, each primary attribute describes a song as a combination of two or more constituent sub-identifiers. In one example implementation, the primary attribute of a song is the title of the song and the composer of the song. In a second example, the primary attribute of a song is the title of the song, the composer of the song, and the performer. The master index is described in terms of these examples for illustration and clarity only, but other combinations and numbers of constituent sub-identifiers may be utilized. For example, an alternative implementation of the invention defines the primary attribute of a song as a 4-tuple including the song title, the song composer, the song performer, and song production date.

With an appropriate definition of a song's primary attribute, steps to locating a consumable media object are streamlined. A network user may access the media object by referring directly to its primary attribute, rather than by referring indirectly to secondary characteristics, as elucidated below.

Further, a song, such as "Lyle Lovett performing If I had a Boat," may have two or more versions of the same song available on the network, such as the version originally released on the CD album "Pontiac," an MP3-format version available on Yahoo! Music Service®, a streaming version available from RealNetworks, Inc. for its media player, RealPlayer®, an AIFF-format version available on Apple iTunes®, and so on. Further, access to various versions of the song may be subject to differing licensing agreements, geographic restrictions, available consumer subscriptions, and so on.

When two or more users attempt to access the same song, the users may have conflicting access privileges, preventing access to the same version of the song. In order to facilitate access to the song, the master index server inputs the primary attribute of a song and efficiently locates an assortment of versions with various access privileges.

A user may also desire to access other media objects associated with a song. For example, many songs, such as "Lyle Lovett performing If I Had a Boat," were originally on albums, such as on the CD album "Pontiac." A user accessing a song may desire to access related media objects, such as a textual listing of song lyrics, album cover or booklet art, different song versions, songs on the same album, songs by the same artist(s), songs by the same composer(s), songs in the same genre, and so on. As described, the master index further provides a means to efficiently locate the related media objects.

Figure 3:
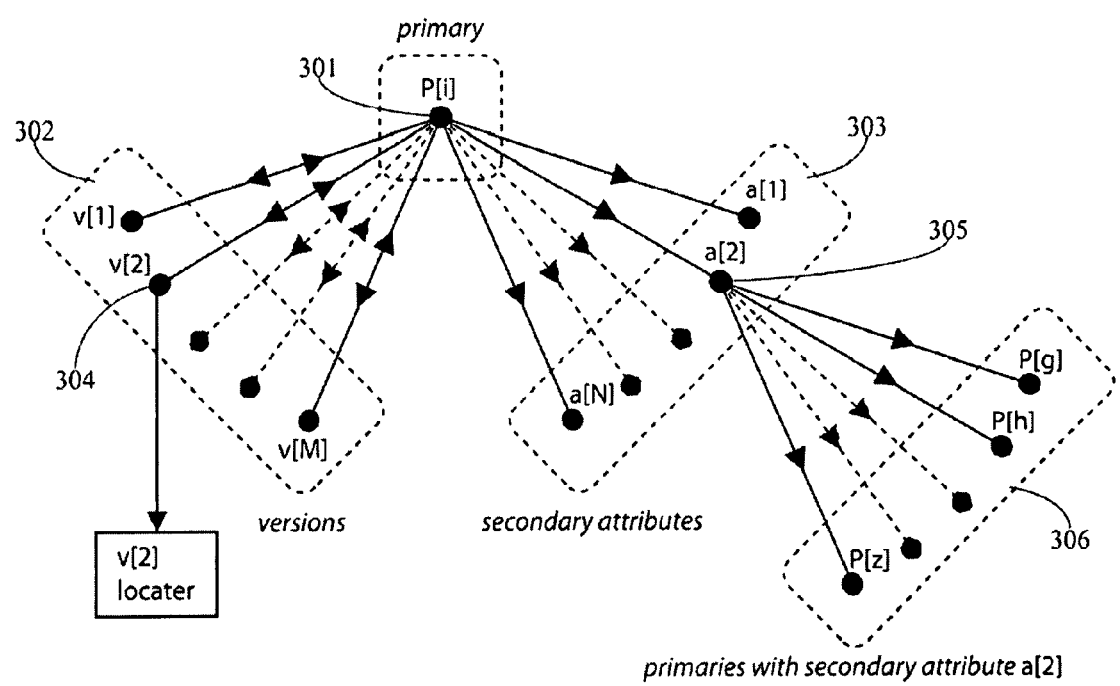
FIG. 3 illustrates a data structure for an example master index.

FIG. 3 illustrates an example data structure for an example song master index. In FIG. 3, the data structure is illustrated as interconnected nodes containing metadata. Nodes are labeled as primary nodes, version nodes, and secondary nodes. A node may contain descriptive metadata as well as one of more addresses of other nodes. When a node contains the address of another node, a directed line illustrates the link from a source-node containing the address of a destination-node. When a node contains the address of a media object available on the network, a directed line illustrates the link from a source-node containing a pointer to the boxed network location of the media object.

Primary node 301 represents a specific song. When the primary characteristic of a song is defined as the song title and performer, the $i^{th}$ referenced primary node, P[i], may, for example, represent the song "Lyle Lovett performing If I had a Boat."

A primary node is connected to one or more version nodes. In the example of FIG. 3, M versions of the $i^{th}$ song, P[i], are available on the network. The various versions are represented by a plurality of version nodes 302. Metadata for a particular example version, v[2], includes a locater as shown in expanded node 304. The metadata contains information about the version, including a network locater for the version, shown here as an address of the location of the media object file for the version v[2] on the network.

In FIG. 3, a directed arrow from primary node 301 to each version indicates that the primary node contains the memory address of the data structure for each version node associated with the primary node. In a first implementation, the primary node contains metadata including the set of access requirements for each version. In an alternate implementation, each version node contains metadata including the set of access requirements for that version. In a third implementation, at least one of the set of access requirements for a version is contained in the primary node, and one or more access requirements for the version are contained in the version node. Further, each version node may contain a returning link consisting of the address of primary node 301.

In FIG. 3, a version node may, for example, represent a copy of the media object accessible from the same service provider as the master index provider, or may represent a media object accessible from a competing service provider. In the former case, the master index service provider may be able to pre-determine a user's privilege to access a version by monitoring the user's access privileges. In the latter case, the user's access privileges may depend on certification via a password or other authentication scheme at a remote version server and therefore, the access privileges may not be pre-determined at the master index. In a first implementation for the former case, a master index version search could pre-determine a suitable version and follow a link from the primary node to the suitable version node. In an alternate implementation for the latter case, a master index version search could form an access request to a remote version host in a version node in a trial-and-error fashion with the result of the access request returned to the primary node. If the access is successful, the results are returned to the user; otherwise, the master index server can traverse from the primary node to a different version node and try another version. Those of skill in the art will appreciate that other implementations of version node pre-determination and attempted access are possible, as illustrated below.

A primary node may optionally be connected to one or more secondary attribute nodes. In FIG. 3, N secondary attributes are identified with the $i^{th}$ song, P[i]. Metadata for the various secondary attributes are represented by a plurality of secondary nodes 303. For example, attribute a[1] may represent a song by Lyle Lovett, attribute a[2] may represent a song from the album Pontiac by Lyle Lovett, attribute a[3] may represent a song in the genre "country", attribute a[4] may represent a song from a Live in Texas album, and so on. Metadata for a particular secondary attribute, a[2], is shown in expanded node 305. The metadata in node 305 contains information about the secondary attribute, including one or more links to songs with the attribute, where each song is represented by a link to the primary node for that song. In this example, the secondary node a[2], representing a song from the album Pontiac, is linked to the primary nodes of other songs on the album Pontiac by Lyle Lovett, shown here as a plurality of primary nodes 306. The metadata in node 305 for secondary attribute a[2] may also contain a returning link to the primary song attribute, P[i], as shown.

In one embodiment, a secondary attribute node may also contain one or more links to other secondary attribute nodes [not shown]. For example, if attribute node a[1] represents songs by Lyle Lovett, and attribute a[2] represent songs from the album Pontiac by Lyle Lovett, a link from attribute node a[1] to attribute a[2] would serve to further identify that a secondary attribute may be a subset of another secondary attribute.

Figure 4:
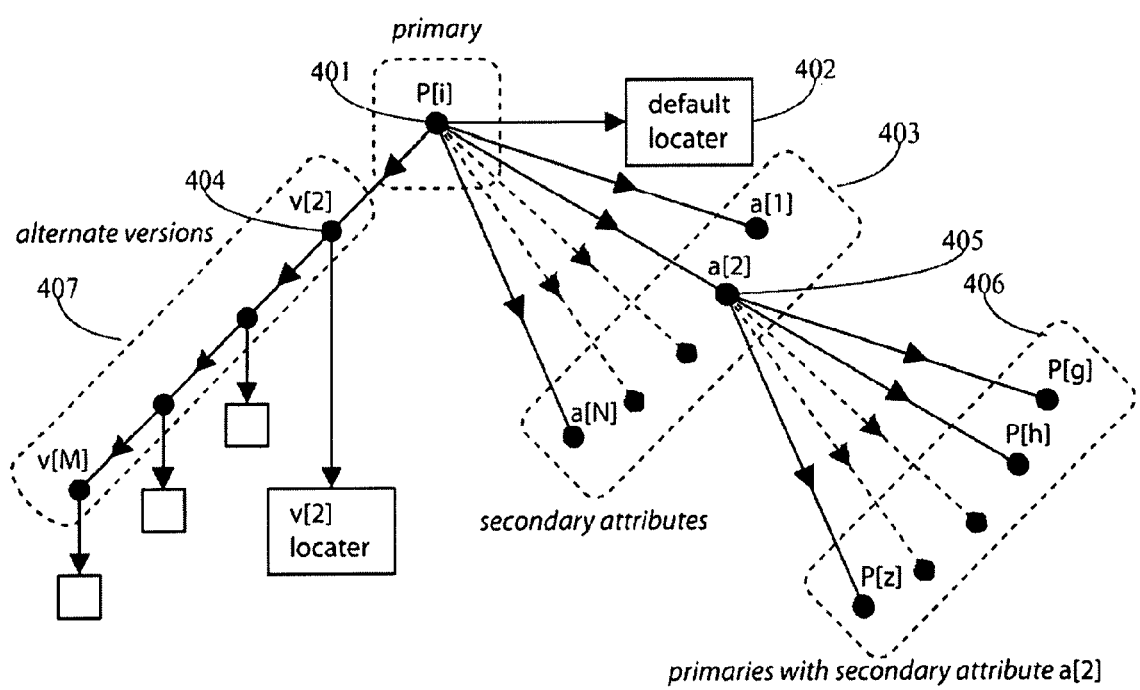
FIG. 4 illustrates an alternative data structure for an example master index.

FIG. 4 illustrates an alternate embodiment of a data structure for an example song master index. As in FIG. 3, the data structure is illustrated as interconnected nodes containing metadata, and directed links to indicate when a node contains the address of another node or a network media object.

Primary node 401 represents a specific song. When the primary characteristic of a song is defined as the song title and performer, the $i^{th}$ referenced primary node, P[i], may, for example, represent the song "Lyle Lovett performing If I had a Boat." The primary node 401 contains (or points to) a default network location 402 for a version denoted v[1]. An advantage of the data structure of FIG. 4 is that it provides one-step translation from a consumer concept of a song to a default network location for the media object most commonly associated with the concept.

In addition, a primary node may be connected to one or more alternate version nodes, as shown in FIG. 4. In the example of FIG. 4, M versions of the $i^{th}$ song, P[i], are available on the network. The various versions are represented by a default locater 402 within primary node P[i], and a plurality of alternate version nodes 407. Metadata for a particular alternate version, v[2], is shown in expanded node 404. The metadata contains information about the version, including a network locater for the version, shown as a "v[2] locater" of the media object file for the version v[2] on the network. In FIG. 4, a primary node P[i] may also be linked to a plurality of secondary attribute nodes 403, and an example expanded secondary attribute node 405 for a[2] is illustrated as containing a plurality of links to primary nodes 406 with the secondary attribute a[2].

FIG. 4 may be particularly suited for applications where various versions typically require an attempt at access to determine whether the requester has the access privileges. For example, a requester may seek songs from password-protected service providers, but may not be willing or able to provide those passwords through the index service provider. Instead, the index service provider may provide the requester with a location to attempt access to a music server, allow the requester to attempt access to the location at the music server, and if access fails, form another request to the index service provider if the access is unsuccessful. In a trial-and-error mode, the index service provider provides a media object location on the network and a next alternate version node to use for the next attempt if the current attempt is unsuccessful. For example, suppose that node 404 represents a version of Lyle Lovett's If I had a Boat, available on YME. A service provider may facilitate access to the song by providing a response including both a location on a YME server for the song and an alternate version identifier corresponding to v[3]. When the requester attempts access to the YME service, the YME service provider may check, for example, a password or a subscription service status to determine if the requester is allowed access to v[2]. If access to v[2] is denied, the requester is prepared to form an alternate version request to the index service provider.

Figure 5:
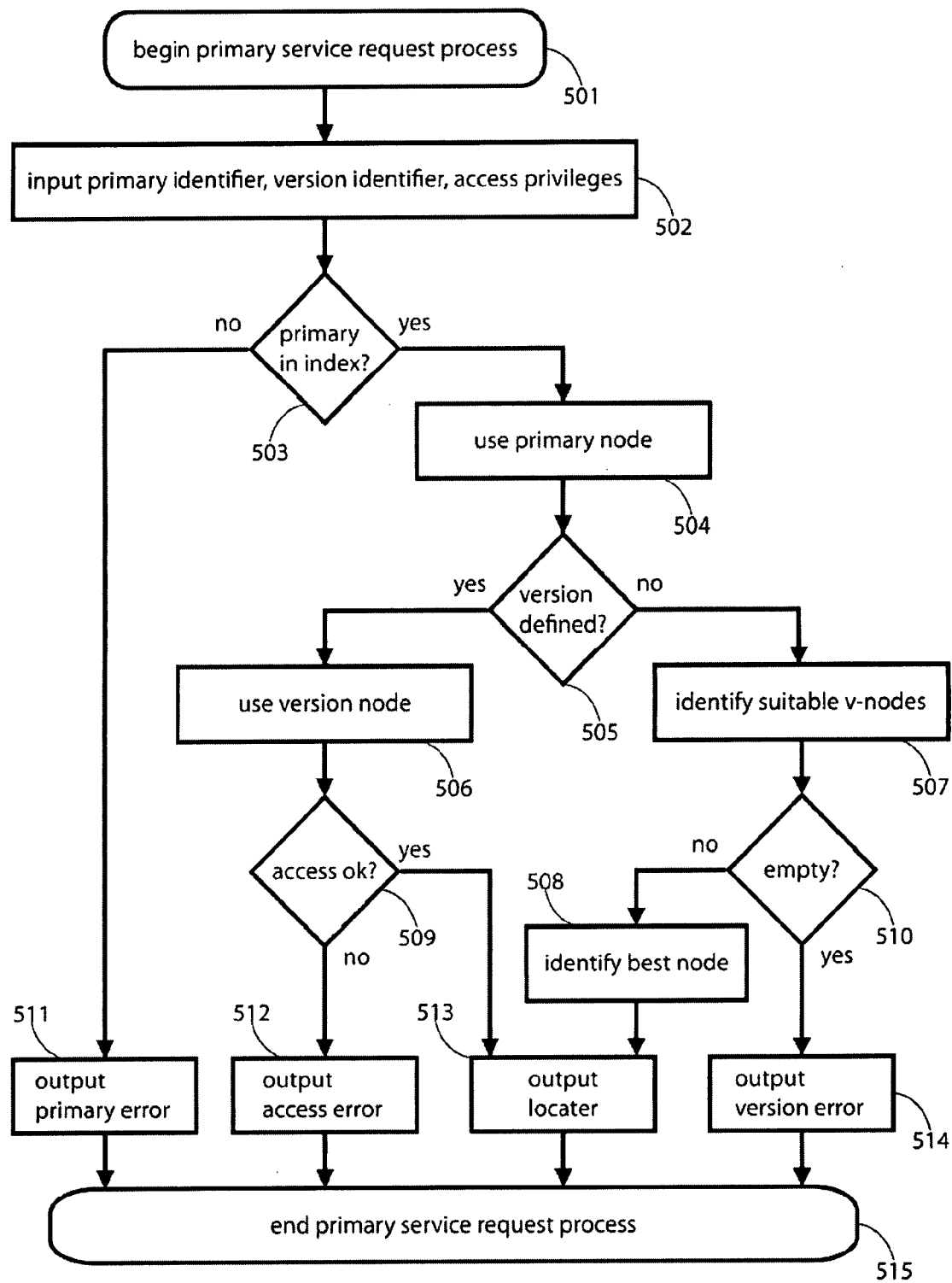
FIG. 5 is an example flowchart for an example primary service request.

FIG. 5 is a flowchart representing an example primary service request process at a master index server consisting of a number of software steps, assuming the data structure of FIG. 3. The primary service request process begins in step 501 by parsing user input to determine a primary song identifier, a song version identifier (if any), and user access privileges (if any) in step 502. The master index is searched for the primary node corresponding to the song identifier. The status of the search process is monitored in step 503. If the search is successful, the primary node is used as the starting address in step 504; otherwise, the song is not in the master index, and a no-such-song error message is output in step 511. When the search is successful, a primary node is identified in step 504, and the service request is checked for a song version identifier in step 505.

If a version is defined in the service request, the version node is used as the secondary address in step 506, and access privileges are checked in step 509. If the user is privileged to access the requested version, the location of that version is output in step 513; otherwise, an insufficient-access error message is output in step 512.

In an alternate embodiment, a primary service request process accepts requests in a mode without user identified access privileges. In response, the service request process may provide an alternate locator consisting of a password-enabled or encrypted locater in step 512. In this mode, the check of user access privileges is postponed until the user attempts to access the media object's location. For example, a user of YME may be provided a YME network location that is unlocked using a YME access control mechanism.

If the song version is not identified in the service request, the service provider determines a version, and step 505 proceeds to step 507. In step 507, a list of suitable version nodes for the user is determined. The list is checked in step 510. If the list is empty, a no-available-version error message is output in step 514; otherwise the best node in the list identifies a best or first available version in step 508. The location of that version is output in step 513. Optionally, one or more other version locations for other version nodes in the list is output in step 513. The primary service request process ends in step 515.

Figure 6:
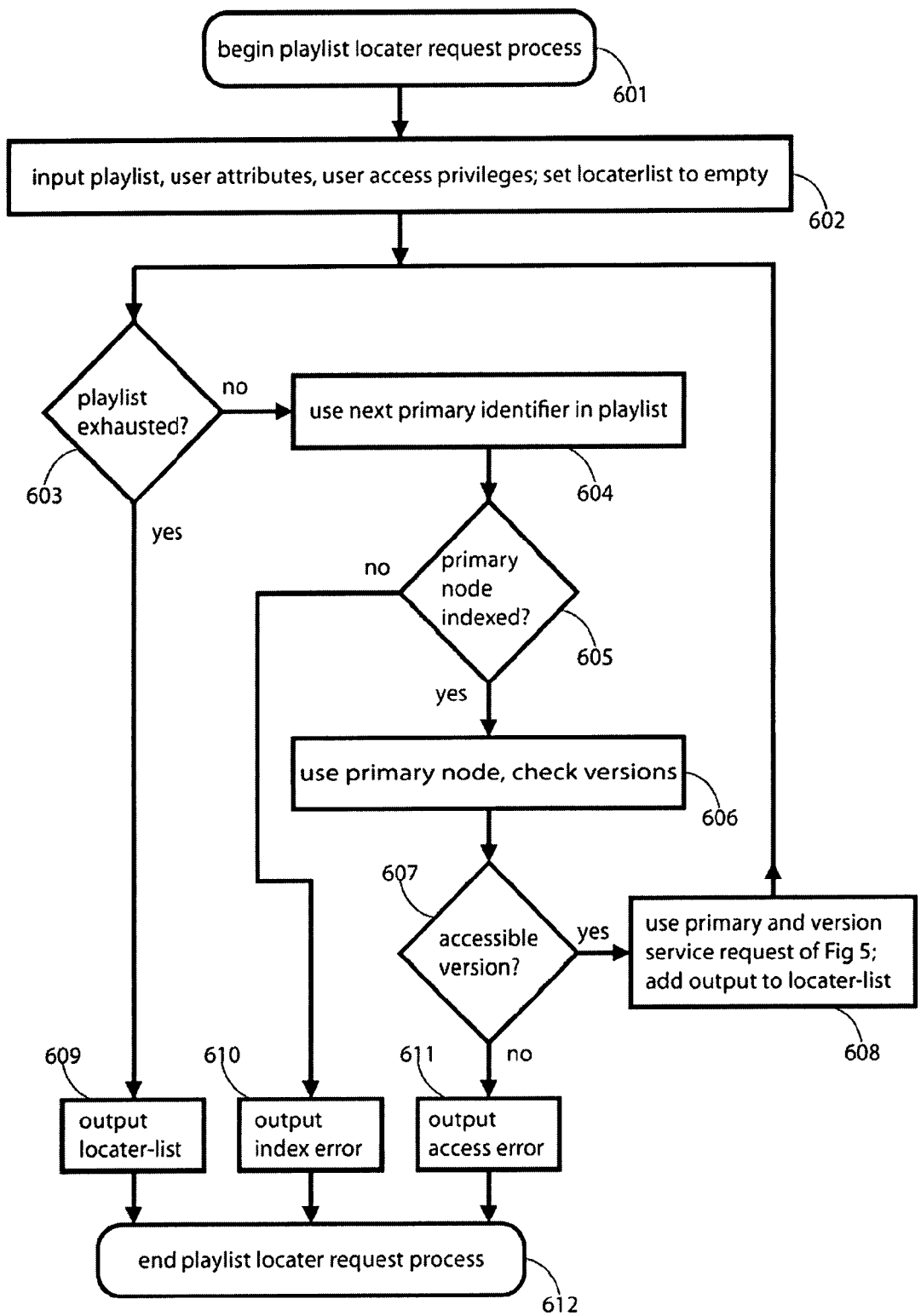
FIG. 6 is an example flowchart for an example secondary service request.

FIG. 6 is a flowchart representing an example playlist resolver locater request process consisting of a number of software steps. The playlist locater request process begins in step 601. In the request, the requester identifies a list of songs, the "playlist", and optionally one or more requester attributes, such as requester access privileges. The playlist-resolver parses the request in step 602. The requester access privileges may be directly designated, or may be indirectly derived from one or more other user attributes. For example, directly designated requester access privileges may include one or more of subscriptions to online music providers, identifiers and/or passwords to music provider services, or credits with online music providers. Examples of indirectly derived access privileges is an access privilege derived from the age or geographic location of the requester. As previously mentioned, a version of a media object may be licensed in a geographically restricted region, and a requester may be allowed to access the version of the media object if and only if the location of the requester is within the geographically restricted region.

In FIG. 6, the process attempts to translate a list of user songs into a list of corresponding accessible network locations for the songs, referred to as a "locater-list". In FIG. 6, is assumed that requester access privileges for versions in the index may be determined prior to attempting access.

Step 602 initializes the output locater-list by resetting it to "empty."

In step 603, the playlist-resolver determines if the playlist has been "exhausted". If so, all entries in the list have been processed, and the locater-list is transmitted to the requester in step 609. Otherwise, there is at least one more entry in the playlist to process. The playlist is parsed to obtain a primary attribute identifier of a next song in the playlist in step 604. In step 605, the playlist-resolver server communicates with the master index server to access the searchable index to determine if the primary attribute corresponds to a primary node in the index. If not, an error message is output in step 610. If so, the primary node is accessed to check attributes of one or more versions of the next song in step 606. If the access privileges of the requester are insufficient to meet the access requirements of one or more versions, an access error is output in step 611. Otherwise, an accessible version exists in step 607, and the location of an accessible version is obtained from the master index server and added to the locater-list in step 608. Step 608 returns to step 603 to check if the playlist is now exhausted. If not, the process attempts to proceed through steps 604-608 to add another entry to the locater-list. The process continues in this manner until an error is encountered or the playlist is exhausted. Once one of these final events takes place, the playlist locater request process ends in step 612.

Figure 7:
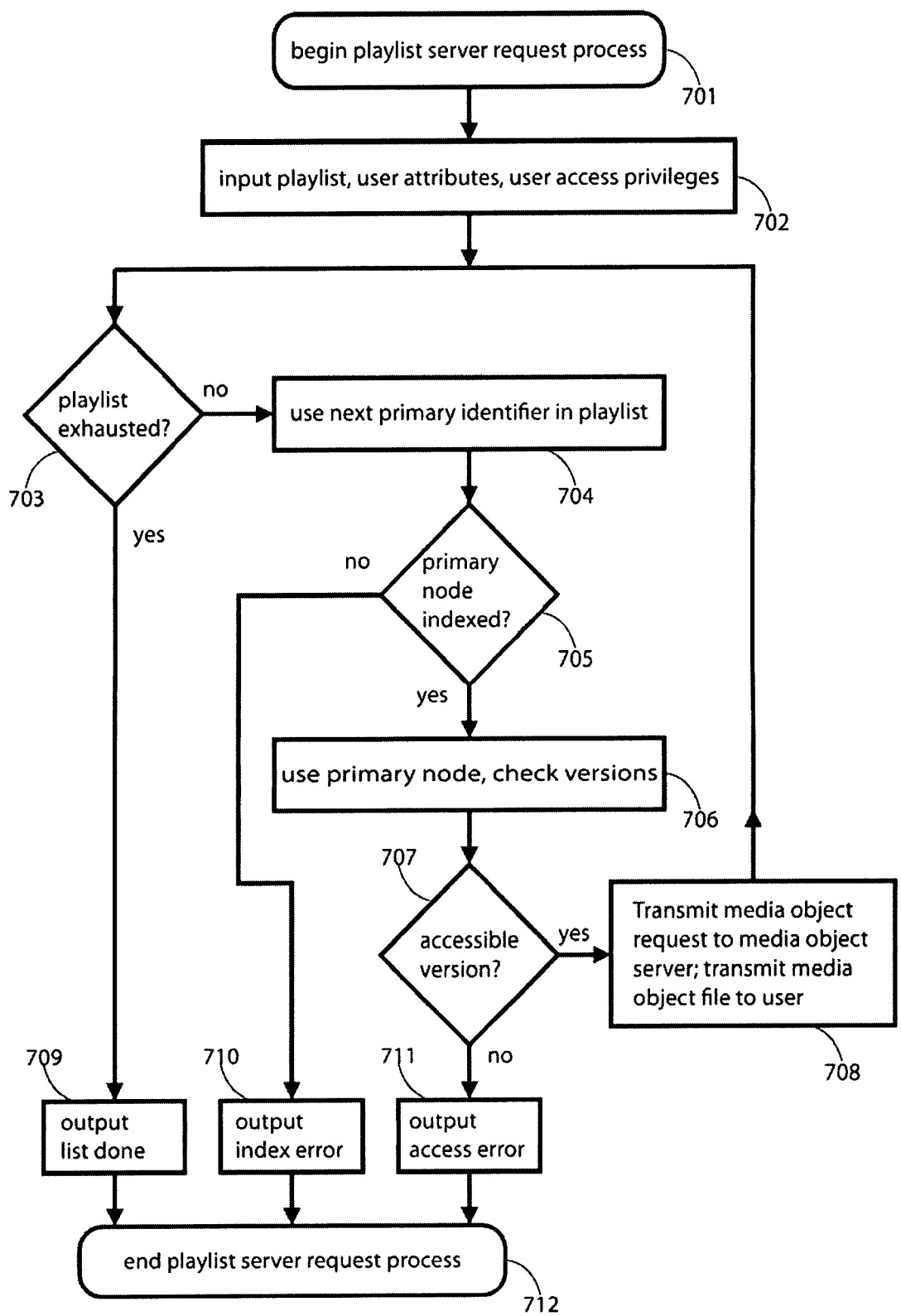
FIG. 7 is an example flowchart for an index entry augmentation service request.

FIG. 7 is a flowchart of an example playlist server request process. In the playlist server process, the playlist-resolver attempts to access the songs in the playlist, and when successful, retransmits the media object file to the requester. The playlist server request process begins in step 701. In the request, the requester identifies a list of songs, the "playlist", and optionally one or more requester attributes, such as requester access privileges. The playlist-resolver parses the request in step 702. The process proceeds as in FIG. 6, with steps 703-705 identical to steps 603-605. In step 706, however, one or more version locations is checked by forming a request to a music server for the status of the located version. If one or more music servers responds to verify the existence of an accessible version, step 707 proceeds to step 708 to transmit a media object request to the media server. If, however, there is no accessible version, step 707 proceeds to step 711 to output an access error. If a playlist is exhausted, step 703 proceeds to step 709 to provide an output indicating that the list is done. Also, if the primary node is not indexed, step 705 proceeds to step 710 to output an index error. Once an output is provided in step 709, 710, or 711, the playlist server request process ends in step 712. In one implementation, the media object request further designates the requester as the recipient of the media object in the media object request. In an alternate embodiment, the media object request further designates the playlist-resolver server as the recipient of the media object in the media object request, and the playlist-resolver server retransmits the media object to the requester. The remainder of FIG. 7 proceeds as in FIG. 6, sequentially causing transmission to the requester of the media objects corresponding to the entries in the playlist, until the playlist is exhausted.

In FIGS. 6 and 7, the requester is presumed able to consume the playlist media objects using a software application, such as a media object player or a browser, or a hardware device. For didactic purposes, assume the requester is using a media object player. If the requester encounters a failure to access the supplied location of a media object in the output location-list of FIG. 6, or, alternatively, the transmission of a media object to the requester fails in FIG. 7 in step 708, the flowcharts do not indicate a means to access an alternate version of the media object. To overcome this limitation, a software program known as a plug-in is used to augment the functionality of a requester application, such as a browser or a media object player. For example, consider a media object player plug-in. The plug-in operates in the background to assist and monitor the transmission of media object files for the media object player, and to signal the playlist-resolver when a transmission fails.

Figure 8:
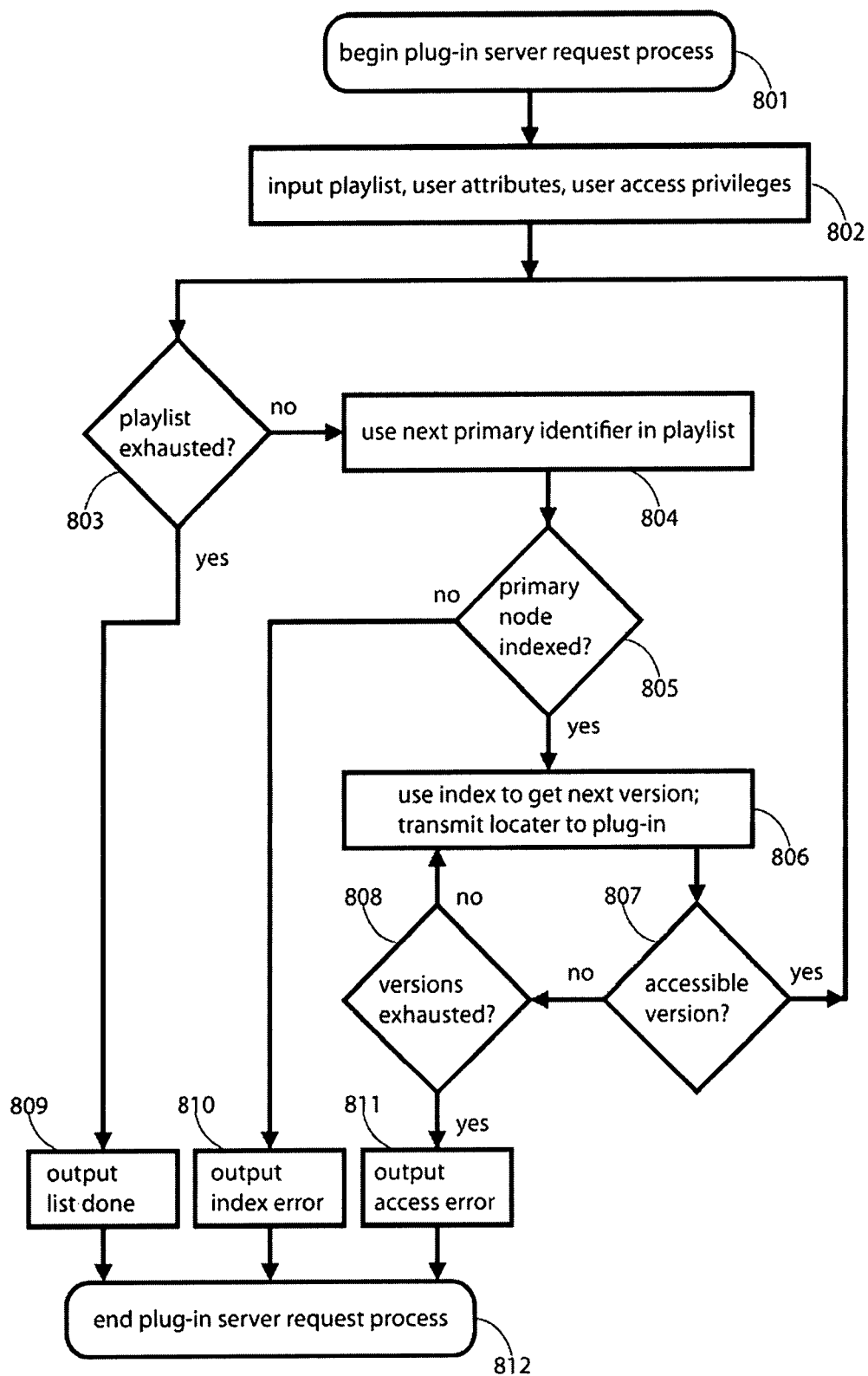
FIG. 8 is an example flowchart for an index entry removal service request.

An example flowchart for a plug-in server request process at a playlist-resolving server is shown in FIG. 8. In FIG. 8, it is assumed that versions are accessed in a trial-and-error fashion, where the playlist-resolver sequentially supplies one or more network locations for attempted access by the plug-in. The plug-in server request process begins in step 801. In the request, the requester identifies a list of songs, the "playlist", and optionally one or more requester attributes, such as requester access privileges. The playlist-resolver parses the request in step 802. In step 805, if the requested song is in the master index, the process proceeds to step 806 to transmit a locater for a next version to the plug-in. If, however, the requested song is not in the master index, the process proceeds to step 810 to output an index error. In one implementation, the playlist-resolver also dynamically generates and transmits to the plug-in an appropriate service request for the next version's music server. In an alternate implementation, the appropriate service request for the next version's music server is dynamically generated in the plug-in. The status of the service request is monitored in the plug-in and transmitted to the playlist-resolver. If the music server provides access to the media object, the status is successful, and the process returns from step 808 to step 803 to check for a next playlist entry. If the playlist is not exhausted, the next primary identifier in the playlist is accessed in step 804 and the process proceeds to step 805. If the playlist is exhausted, the process proceeds from step 803 to step 809 to provide an output indicating that the list is done. If, however, the music server denies access to the media object or the transmission of the media object fails, the plug-in transmits the failed status of the access request to the playlist-resolver, which proceeds to step 808 to check if there are any remaining versions. If there are no remaining versions, an access error message is output to the requester in step 811. Otherwise, the process proceeds from step 808 to step 806 to attempt a next version. The 806-808 loop continues until an accessible version is found, or all the versions are exhausted. Once an output is provided in step 809, 810, or 811, the plug-in server request process ends in step 812. By incorporating feedback from the plug-in to the plug-in server process, the plug-in server process is able to confirm access to a version or substitute access to one or more alternative versions to ensure that the requester is able to reliably access the songs in the playlist. By operating in the background, the plug-in server process is able to facilitate access and pre-buffering of a set of media objects for an entire playlist while the media object player is playing.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus comprising:
a playlist-resolver server;
a master-index server; and
a searchable datastore of primary concept attributes,
said apparatus configured to:
associate a set of primary concept attributes with a set of primary nodes in the datastore, wherein each primary node in the set of primary nodes corresponds to a unique creative composition;
categorize one or more media objects of a repository, wherein each of said one or more media objects is regarded as a version of one member in the set of primary nodes;
maintain a searchable index of the set of primary nodes and the versions; and respond to a request from a requester at a remote host for resolution of a list comprising one or more primary concept attribute identifiers, by, for each primary concept attribute identifier in the list:
- accessing the searchable index to determine a primary node in the datastore associated with the primary concept attribute identifier;
- determining, from the primary node, one or more version nodes in the datastore, each of the one or more version nodes corresponding to a version of the unique creative composition;
- determining, from the one or more version nodes, an accessible version node corresponding to an accessible version of the unique creative composition for the requester;
- determining, from the accessible version node, a network location for an accessible media object;
- adding the network location of the accessible media object to a location list; and
- transmitting the location list to the remote host.

2. The apparatus according to claim 1, wherein the accessible version node is determined by comparing one or more version access requirements to one or more requester attributes.

3. The apparatus according to claim 2, wherein the one or more version access requirements include one or more of a requester age range, a bounded geographic region for the requester, a music service subscription for the requester, a music service credit for the requester, and a music service password for the requester.

4. A computer-implemented method comprising:
responding to a request from a requester at a remote host to resolve a list comprising one or more primary concept attribute identifiers, by, for each primary concept attribute identifier in the list:
- accessing a searchable datastore index for a datastore of primary concept attributes to determine a primary node in the datastore associated with the primary concept attribute identifier, wherein the primary node corresponds to a unique creative composition;
- determining, from the primary node, one or more version nodes in the datastore, each of the one or more version nodes corresponding to a version of the unique creative composition;
- determining, from the one or more version nodes, an accessible version node for the requester based on attributes of the one or more version nodes and one or more requester attributes, wherein the accessible version node corresponds to an accessible version of the unique creative composition;
- determining, from the accessible version node, a remote media object server having an accessible media object corresponding to the accessible version of the unique creative composition;
- dynamically generating and transmitting a request to a remote media object server for the accessible media object;
- buffering the accessible media object received in response to the transmitted request to the remote media object server; and
- transmitting the accessible media object to the remote host.

5. The computer-implemented method of claim 4, wherein the primary concept attributes relate to a respective musical composition and has two components related to a performer of the respective musical composition and a title of the respective musical composition.

6. The computer-implemented method of claim 4, wherein the primary concept attributes relate to a respective musical composition and has three components related to a performer of the respective musical composition, a title of the respective musical composition, and a composer of the respective musical composition.

7. The computer-implemented method of claim 4, wherein the accessible version node is determined by comparing one or more version access requirements to the one or more requester attributes.

8. The computer-implemented method of claim 7, wherein the one or more version access requirements include one or more of a requester age range, a bounded geographic region for the requester, a music service subscription for the requester, a music service credit for the requester, and a music service password for the requester.

9. An apparatus comprising:
a playlist-resolver server;
a master-index server; and
a datastore of primary concept attributes,
said apparatus configured to:
- associate a set of primary concept attributes with a set of primary nodes in the datastore, wherein each primary node in the set of primary nodes corresponds to a unique creative composition;
- categorize one or more media objects of a repository, wherein each of said one or more media objects is regarded as a version of one member in the set of primary nodes;
- maintain a searchable datastore index of the set of primary nodes and the versions; and
- respond to a request from a requester at a remote host for resolution of a list comprising one or more primary concept attribute identifiers, by, for each primary concept attribute identifier in the list:
  - accessing the searchable datastore index to determine a primary node associated with the primary concept attribute identifier;
  - determining, from the primary node, one or more version nodes in the datastore, each of the one or more version nodes corresponding to a version of the unique creative composition;
  - determining, from the one or more version nodes, an accessible version node for the requester based on attributes of the one or more version nodes and one or more requester attributes, wherein the accessible version node corresponds to an accessible version of the unique creative composition;
  - determining, from the accessible version node, a remote media object server having an accessible media object corresponding to the accessible version of the unique creative composition;
  - dynamically generating and transmitting a request to a remote media object server for the accessible media object;
  - buffering the accessible media object received in response to the transmitted request to the remote media object server; and
  - transmitting the accessible media object to the remote host.

10. The apparatus according to claim 9, wherein the accessible version node is determined by comparing one or more version access requirements to the one or more requester attributes.

11. The apparatus according to claim 9, wherein the one or more version access requirements include one or more of a requester age range, a bounded geographic region for the requester, a music service subscription for the requester, a music service credit for the requester, and a music service password for the requester.

12. A computer-implemented method comprising:
responding to a request from a requester at a remote host to resolve a list comprising one or more primary concept attribute identifiers, by, for each primary concept attribute identifier in the list:
accessing a searchable index for a datastore of primary concept attributes to determine a primary node associated with the primary concept attribute identifier, wherein the primary node corresponds to a unique creative composition;
determining, from the primary node, one or more version nodes in the datastore, each of the one or more version nodes corresponding to a version of the unique creative composition; and
sequentially facilitating an attempted access by the remote host to an untried version node in the one or more version nodes by:
determining a network location of a media object corresponding to the version of the unique creative composition from the untried version node;
transmitting one or more attributes of the version of the unique creative composition from the untried version node including the network location of the media object to the remote host;
receiving a status of attempted access by the remote host to the media object; and
continuing with another untried version node if the attempted access failed.

13. The computer-implemented method of claim 12, wherein the primary concept attributes relate to a respective musical composition and has two components related to a performer of the respective musical composition and a title of the respective musical composition.

14. The computer-implemented method of claim 12, wherein the primary concept attributes relate to a respective musical composition and has three components related to a performer of the respective musical composition, a title of the respective musical composition, and a composer of the respective musical composition.

* * * * *